United States Patent [19]
von Greyerz

[11] Patent Number: 5,713,813
[45] Date of Patent: Feb. 3, 1998

[54] TRANS-PLANETARY MECHANICAL TORQUE IMPELLER

[76] Inventor: John W. von Greyerz, 3773 Silver Lace La., Boynton Beach, Fla. 33436

[21] Appl. No.: 683,209

[22] Filed: Jul. 18, 1996

[51] Int. Cl.[6] ........................................ F16H 3/74
[52] U.S. Cl. .................. 475/257; 475/199; 475/204; 475/296; 475/307; 475/330
[58] Field of Search ..................... 475/257, 269, 475/306, 307, 329, 330, 338, 341, 198, 199, 204, 221, 248

[56] References Cited

U.S. PATENT DOCUMENTS

| | | | |
|---|---|---|---|
| 1,998,891 | 5/1935 | Benson | 475/296 |
| 2,066,758 | 1/1937 | Bassoff | 475/296 |
| 2,137,778 | 11/1938 | McCullough | 475/296 |
| 2,143,452 | 1/1939 | Reynolds | 475/257 |
| 2,209,367 | 7/1940 | Waston | 475/330 |
| 2,985,036 | 5/1961 | Förster | 475/218 |
| 3,298,251 | 1/1967 | Moss | 475/77 |
| 3,372,608 | 3/1968 | Gleasman | 475/296 |
| 3,578,117 | 5/1971 | Ahlem | 74/731.1 |
| 3,678,786 | 7/1972 | Szekely | 74/724 |
| 3,901,096 | 8/1975 | Woody | 74/730.1 |
| 4,016,778 | 4/1977 | Von Greyerz | 475/32 |
| 4,016,779 | 4/1977 | Von Greyerz | 74/724 |
| 4,983,151 | 1/1991 | Pires | 475/296 |
| 5,059,163 | 10/1991 | Von Greyerz | 475/296 |

FOREIGN PATENT DOCUMENTS

| | | | |
|---|---|---|---|
| 866,926 | 6/1941 | France | 475/330 |
| 2 136 069 | 9/1984 | United Kingdom | 475/330 |

Primary Examiner—Charles A. Marmor
Assistant Examiner—Sherry Lynn Estremsky
Attorney, Agent, or Firm—Jones, Tullar & Cooper, P.C.

[57] ABSTRACT

A trans-planetary mechanical torque impeller utilizes at least two sets of input planetary pinion gears of differing sizes, which are supported by a planetary carrier. These input planetary pinion gears rotate with respect to primary and secondary annulus gears which, in turn, drive bevel gears which engage a differential pinion gear to drive an output shaft. The output shaft load causes the torque impeller to automatically vary its gear ratio to match the input shaft or motor power output capability to the output shaft load.

4 Claims, 6 Drawing Sheets

TRANS-PLANETARY MECHANICAL TORQUE IMPELLER

FIELD OF THE INVENTION

The present invention is directed generally to a torque impeller or mechanical torque converter. More particularly, the present invention is directed to a trans-planetary mechanical torque impeller. Most specifically, the present invention is directed to a trans-planetary mechanical torque impeller capable of matching the input shaft capability to the output shaft load. The trans-planetary mechanical torque impeller utilizes torque-type propulsion through a simplified, totally mechanical, self-governing low to high gear torque impeller to automatically match the input shaft or motor power output capability to the output shaft load.

DESCRIPTION OF THE PRIOR ART

The field of power transmission and conversion has been consistently dominated with transmissions having multiple gear sets, clutches and shifting linkages to provide high torque output at low speed for start up operations, especially in the automotive field. In the prior art, complex torque converters having automatic shifting assemblies have also been in use for decades to eliminate the need for shifting gears manually. They require at least temporary gear case attachments and fluid pumps that render substantial power losses within the power train. Manual shifting devices are commonly used having 4 or 5 forward speeds that also require differential ratios approximating 3 to 1 rendering them also inefficient.

In my prior U.S. Pat. No. 5,059,163 there is disclosed a trans-planetary mechanical torque impeller which is somewhat similar in structure and operation to the present invention. In this prior device, an input shaft is used to drive a primary worm gear which causes a control worm gear to govern rotation of a primary annular gear. This primary annular gear is indirectly connected to the output shaft and serves as a base gear and meshes with planetary gears that drive a secondary annular gear which, in turn, is connected to, and operates, the output shaft. This prior device, while it operates very well, is somewhat structurally complex and utilizes crossed helical gears which could be susceptible of unusual wear due to friction generated in gears of that type.

The improved trans-planetary mechanical torque impeller of the present invention eliminates the use of worm or helical gears and uses a restricted differential gear arrangement thereby overcoming stringent manufacturing difficulties while also providing longer wear than the prior art and will, in effect, overcome the deficiencies of generally known devices greatly decreasing fuel consumption for a cleaner environment. In particular, it also eliminates the need for manually shifting gears on bicycles for changing road or field grade conditions.

The trans-planetary mechanical torque impeller in accordance with the present invention overcomes the limitations of the prior art devices. It is a substantial improvement in the art.

SUMMARY OF THE INVENTION

It is an object of the present invention to provide a torque impeller or mechanical torque converter.

Another object of the present invention is to provide a trans-planetary mechanical torque impeller.

A further object of the present invention is to provide a trans-planetary mechanical torque impeller capable of matching the input shaft capability to the output shaft load.

Still another object of the present invention is to provide an improved, more effective torque impeller.

Yet a further object of the present invention is to provide an improved, less stringent, easier to manufacture trans-planetary mechanical torque impeller.

Even still another object of the present invention is to provide an improved trans-planetary torque impeller having infinite gear ratios with no gear case attachments and the ability to out-perform prior art devices.

As will be discussed in greater detail in the description of the preferred embodiment which is presented subsequently, the improved trans-planetary mechanical torque impeller in accordance with the present invention, is a key element in a drive train that utilizes the output shaft load itself for a power take off and self help to infinitely drive the totally mechanical torque impeller. It has no worm gears, no pumps, no bands, no power operated clutches, no gear case attachments and no shifting is required. This improved torque impeller can be used in series with any type motor to infinitely and more efficiently drive such units as conveyors, elevators, car washes, some variable speed machinery plus every type of moving land based vehicle from bicycles or motor cycles to the largest trucks requiring added power at start-up plus an increase in speed under variable load and power conditions.

An input shaft is used to drive a planetary carrier, housing two or more sets of coupled unmatched planetary pinion gears which are revolved within associated unmatched annulus gears. The circumferential difference in gear size is then applied rotationally to two elements of a three element differential pinion gear thereby rotating the associated ring gear and attached output shaft and resulting in a designed and positive low gear ratio at start-up thus applying torque to the output shaft, all of which is operable in one rotational direction only. A wide range of start-up gear ratios, such as 4 or 5 to one down to 50 or more to 1 can be made available by small changes in the unmatched, coupled, planetary gears. When lower gear ratios are required, two methods can be used. Two torque impellers can be placed in series for the desired range. As, for example, two 12 to 1 ratio torque impellers in series would produce a 144 to 1 ratio at start-up. In addition, a truck or tractor having a 5-1 ratio differential and equipped with a 30-1 ratio torque impeller would, in effect, produce a 150-1 motor to drive wheel start-up ratio.

The trans-planetary torque impeller in accordance with the present invention will continually seek a 1-1 ratio or the optimum ratio attainable. When the torque impeller of this invention has attained a 1-1 ratio, the entire internal unit revolves as a solid. It will permit smaller motors to be used without sacrificing power in many cases, especially at start-up, and will greatly reduce manufacturing costs when compared to the automatics as well as manual shifting devices. It will permit, for example, a 0.75 to 1 ratio differential to be used without sacrificing start-up speed which will result in a true overdrive thereby greatly reducing fuel consumption. Over-drive could be achieved, even during in-town driving at moderate speeds. It will greatly enhance the usage of battery or electric power operated vehicles thereby substantially reducing fossil fuel usage for a cleaner environment.

When the improved trans-planetary mechanical torque impeller of the present invention is used in the rear hub of a bicycle, in conjunction with a larger front sprocket that is larger than the prior art, much greater speeds can be achieved on level or down-hill grades without manual shifting at any time. It will immediately respond to all terrains such as would be encountered on dirt bikes. No power losses would result from changing gear ratios, as with prior art devices, and the torque impeller will provide a trouble-free more dependable cycle, bicycle, or motorized bicycle plus motorcycle mode of transportation.

The improved trans-planetary mechanical torque impeller of the present invention is infinitely variable and provides high starting torque when needed, is totally adaptable in virtually all power moving devices and will continually seek a 1 to 1 ratio with higher speeds and direct drive in a manner which is a substantial improvement in the art.

BRIEF DESCRIPTION OF THE DRAWINGS

While the novel features of the trans-planetary mechanical torque impeller in accordance with the present invention are set forth with specificity in the appended claims, a full and complete understanding of the invention may be had by referring to the detailed description of the preferred embodiment which is presented subsequently, and as illustrated in the accompanying drawings, in which:

DETAILED DESCRIPTION OF THE PREFERRED EMBODIMENT

Figure 1:
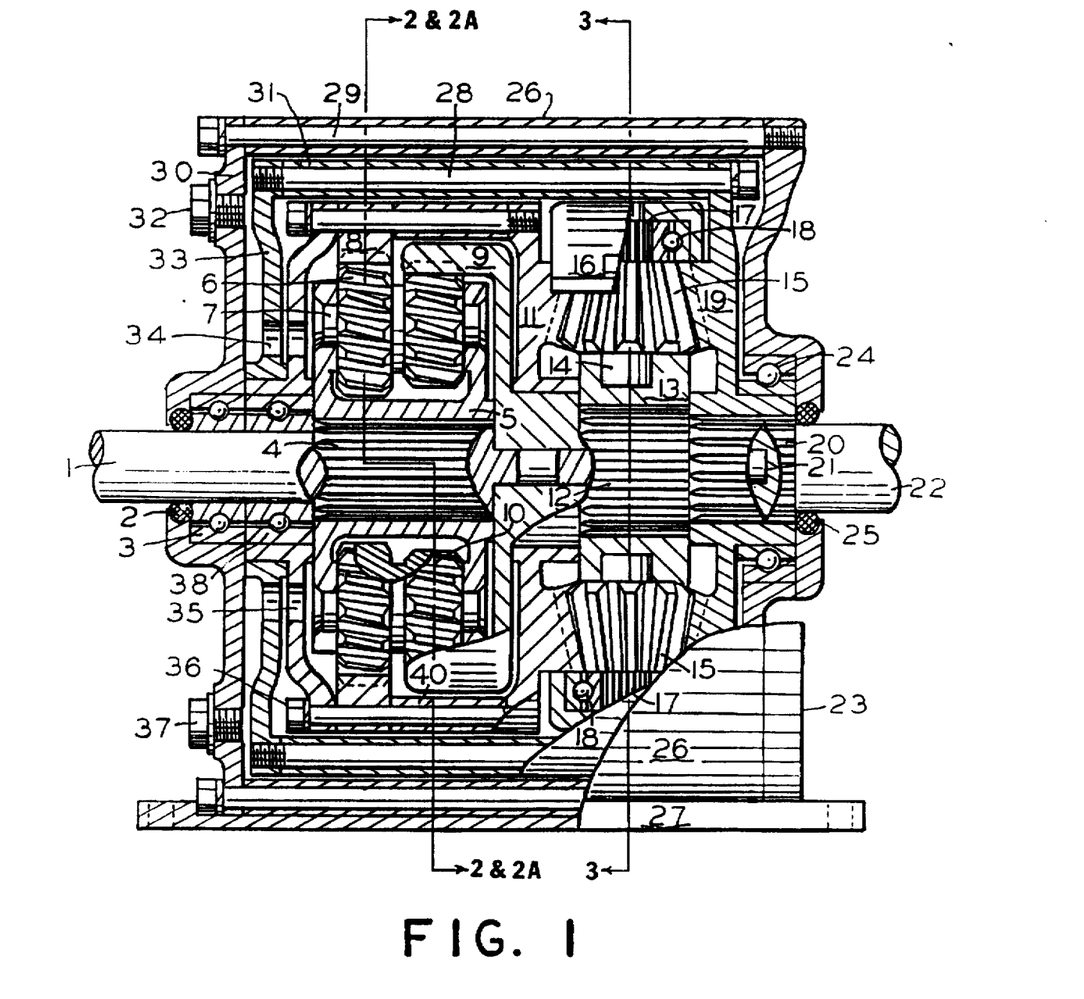
FIG. 1 is a side view of a first preferred embodiment of the present invention, partially in cross-section.

Referring initially to FIG. 1, there may be seen an improved transplanetary mechanical torque impeller in accordance with the present invention. The torque impeller consists mainly of two revolving and working units, one involving input and the other output. As can be seen in FIG. 1, input shaft 1, having splines 4, is driven or revolved by a power source and is stabilized by the input shaft extension stabilizer 21. Input shaft 1 is coupled, through splines 4, to planetary carrier 5 which houses two or more sets of unmatched pinion gears 6 and 10 and which share a common planetary axle 7. A plurality of these pinion gears 6 and 10 may be used as required. Planetary pinion gears 6 are the larger primary pinion gears and they intermesh with primary annulus gear 8. Planetary pinion gears 10 are the smaller secondary pinion gears and they mesh with the secondary annulus gear 9. When input shaft 1 is rotated clockwise rapidly along with carrier 5, as for example at start-up, the unmatched but attached planetary pinion gears 6 and 10 revolve counter clockwise on their axles 7 while intermeshed with their associated annulus gears 8 and 9. If all planetary gears were of equal size, they would of course revolve aimlessly within their annulus gears resulting in no torque or rotation applied to the output section. Their difference in size makes secondary pinion gears 6 and 10 continually pull associated annulus gears 8 and 9 with them until a 1 to 1 ratio has been achieved. The greater the difference in diameter between the planetary pinion gears, the smaller the input shaft 1 to output shaft 22 ratio.

Figure 2:
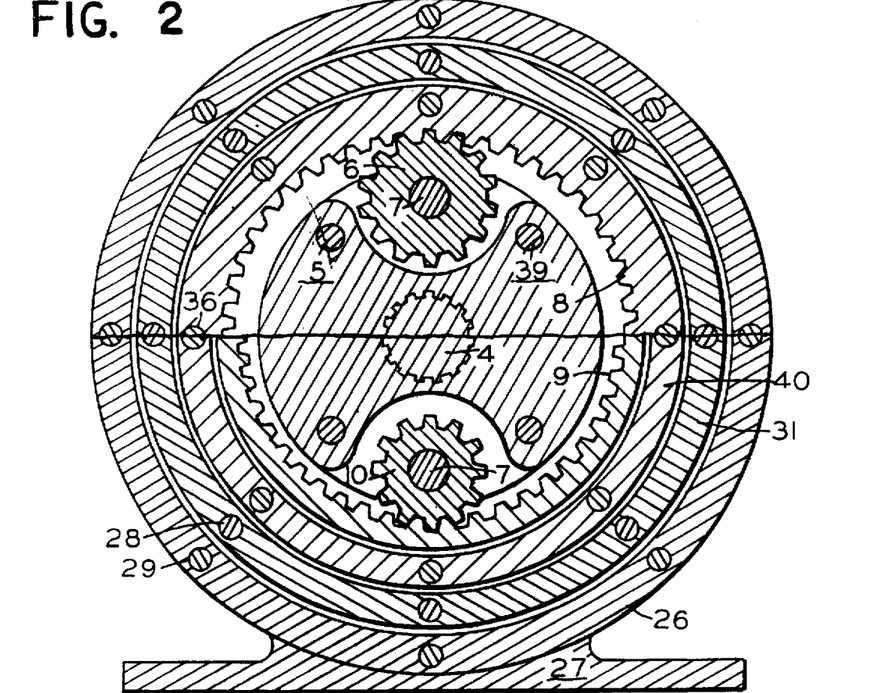
FIG. 2 is a sectional front end view taken along lines 2—2 of FIG. 1.
Figure 2A:
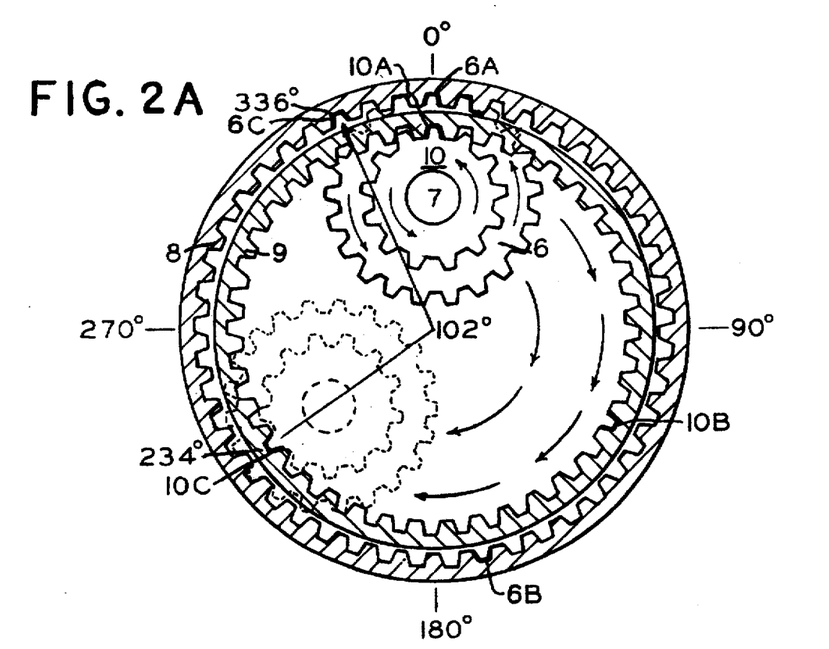
FIG. 2A is an operational view taken along lines 2A—2A of FIG. 1 and showing the basic principal of operation detailing how slow geared down rotation is achieved at start-up through rotation of coupled, unmatched planetary gears within associated unmatched annulus gears.

FIG. 2 and in particular FIG. 2A, illustrates the principle of operation of the present invention. For simplicity and for better understanding, FIG. 2A illustrates in detail the gear action that takes place at start-up on two attached single primary and secondary planetary pinion gears 6 and 10. For clarification, planetary carrier 5 is not shown and gear teeth have been emboldened at the point of start-up, 6A and 10A. As planetary gears 6 and 10 are revolved clockwise as a unit, they axially revolve counter clockwise on their axles 7. If annulus gear 8 is held stationary while planetary gear 6 is revolved one full revolution on its axle from point 6A to point 6B, planetary gear 10 must revolve from point 10A to point 6B and must pull annulus gear 9 from 10B to 6B because planetary gears 6 and 10 are attached or act as a solid. With an additional rotation, planetary gear 6 will rotate from 6B to 6C for a total of 336°. For the two revolutions, planetary gear 10 would pull annulus gear 9 from point 10C to point 6C for a distance of 102° for an approximate 3.3 to 1 ratio. If, for an example, annulus gear 9 were to be held stationary and annulus gear 8 were allowed to revolve counter-clockwise but not clockwise, when planetary gear 10 is revolved clockwise one revolution from 10A to 10B, annulus gear 8 must revolve counter clockwise from 6B to 10B. In another example, at start-up if annulus gear 8 could be allowed to run counter-clockwise only while annulus gear 9 was allowed to revolve clockwise only, annulus gear 8 could, in effect, revolve slightly in reverse while annulus gear 9 revolved slightly forward. However, as the two planetary gears made two revolutions on their common axle 7, the total difference in movement between annulus gears 8 and 9 would still be 102° at start-up. This basically is the key function of the input section whereby this improved trans-planetary torque impeller generates its torque, which is then applied to the output or differential gear which will be explained in greater detail in subsequent paragraphs.

It must be remembered that the smaller the difference in size between the primary and secondary pinion gears 6 and 10 plus their associated annulus gears 8 and 9, the greater the gear ratio obtained. As for example, in the design of a 20 to 1 ratio torque impeller at start-up, there must be a difference in rotation of 18° between annulus gear 8 and annulus gear 9 upon completion of one input shaft 1 plus planetary 5 rotation. Twenty revolutions will then result in a 360° difference in rotation between both annulus gears for a 20 to 1 ratio.

Figure 3:
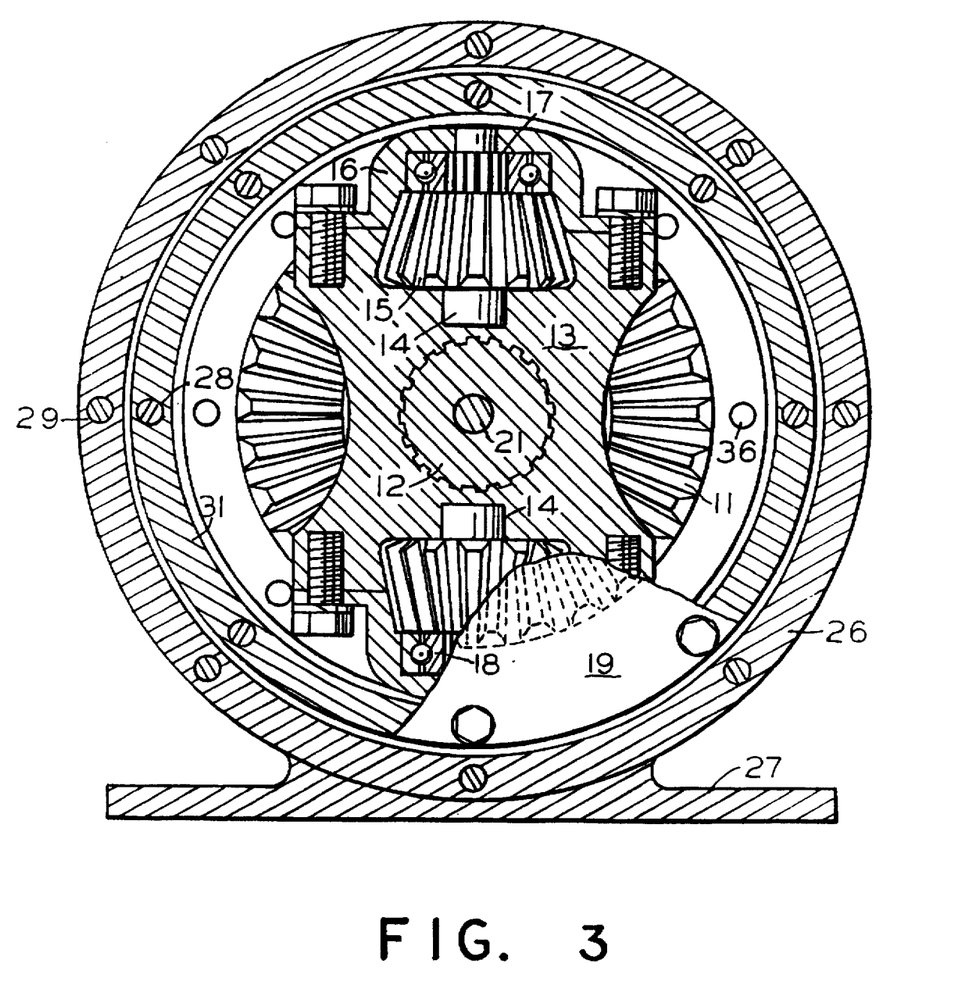
FIG. 3 is a sectional rear end view taken along lines 3—3 of FIG. 1.

Annulus gear 8 forms a part of annulus gear-ring gear housing 40 which is bolted together by annulus gear ring gear housing bolts 36 and primary beveled ring gear 11 which, in turn, meshes with differential pinion gear 1B. Annulus gear 9 is part of an open ended housing that has a shank end that surrounds an input shaft extension stabilizer 21 and is coupled to differential drive carrier 13 through splines 12. Together, both annulus gears drive differential pinion gear 15 which also meshes with output shaft beveled ring gear 19 and which then revolves output shaft 22 through splines 20. Differential pinion gears 15 are supported and rotate on differential pinion gear bearings 14 and are splined through splines 17 to ballbearing or ratchet type one way rotational clutches 18 which are housed in outer differential housings 16 shown in FIGS. 1 and 3.

If primary beveled gear 11 and differential drive carrier 13, along with annulus gears 8 and 9 were allowed to run free or over-run, differential pinion gears 15 would then run wildly around output shaft beveled ring gear 19 without any torque being applied to output shaft 22. Ballbearing or ratchet type, one-way rotational clutches 18 will allow differential pinion gears 15 to revolve on their bearings 14 in one rotational direction only. For this example, if differential pinion gears 15 were only limited to revolve counter-clockwise on their bearings 14, primary beveled ring gear 11 could, in effect, revolve counter-clockwise thereby making beveled ring gear 19 and output shaft 22 run clockwise. Beveled ring gear 11 can therefore go in a limited reverse direction, which adds to the forward rotation of output shaft 22. However, it will never over-run or run faster than beveled ring gear 19 and output shaft 22 and will, in effect, give annulus gear 8 a base for revolving primary pinion gears 6 and secondary pinion gears 10 to revolve secondary annulus gear 9 and associated differential drive carrier 13.

If differential drive carrier 13 was rotated clockwise at 10 RPM while beveled ring gear 11 was rotated counter-clockwise 10 RPM, beveled ring gear 19 would rotate clockwise rapidly at start-up or under load. If then differential carrier 13 was revolved 10 RPM clockwise while beveled ring gear 11 was held stationary, beveled ring gear 19 would then revolve clockwise slower than the above at start up. In another example, if differential drive carrier 13 was revolved 10 RPM clockwise while beveled ring gear 11 was revolved 5 RPM clockwise, beveled ring gear 19 would then revolve clockwise at an even slower pace or ratio at start-up. Under load, or at start-up, the entire unit will revolve at its lowest ratio, taking the path of least resistance, therefore annulus gear 8 and associated beveled ring gear 11 will follow closely behind the RPM's produced on beveled ring gear 19 and output shaft 22.

10, and input shaft 1 was revolved 1000 RPM clockwise at start-up or under load, associated planetary carrier 5 plus planetary gears 6 and 10 would then also revolve 1000 RPM clockwise as a unit while the planetary pinion gears revolved counter-clockwise on their axles 7. The difference in size between planetary gears 6 and 10 would then generate a 15 to 1 ratio difference at start-up between annulus gears 8 and 9 which is then applied to differential pinion gear 15 plus associated output shaft beveled ring gear 19, through beveled ring gear 11 and differential drive carrier 13. Constant torque is therefore placed on annulus gears 8 and 9 which is applied to output shaft 22. As it increases in speed, the axial revolutions on differential pinion gears 15 diminish resulting in an infinite 15 to 1 input shaft 1 to output shaft 22 ratio at start up and resulting in a 1 to 1 ratio at light load. Under light load conditions the entire internal unit revolves as a solid. Unlike a torque converter, which needs a lock-up device for a true 1 to 1 ratio to eliminate slippage, the torque impeller while revolving as a solid at higher speeds, the centrifugal force placed on all moving parts at higher speeds will, in effect, retard movement of individual parts thereby affecting a true 1 to 1 ratio.

It can be seen by reference to table number 1 that a vehicle having a torque impeller and traveling 60 MPH with a motor to drive wheel ratio of 0.9 to 1, would thereby require the motor and drivewheels to revolve at about 841 RPM. When compared to a vehicle with a standard shift and a 3.4 to 1 ratio differential, the motor must revolve approximately 2859 RPM at 60 MPH or more than three times as fast as the torque impeller drive. It can be assumed that a vehicle of this type will also require or consume more than three times as much fuel on the level road as one equipped with a torque impeller and a 0.9 to 1 ratio differential. Overall, it should use approximately 35 to 40% less fuel.

TABLE NUMBER 1

TORQUE IMPELLER VS STANDARD AUTOMOTIVE GEAR SHIFTING TRANSMISSION
24" DIAMETER DRIVE WHEELS

| 15–1 RATIO TORQUE IMPELLER WITH .9 TO 1 RATIO DIFFERENTIAL | | | | 3.4–1 RATIO TRANSMISSION WITH 3.4–1 RATIO DIFFERENTIAL | | | |
|---|---|---|---|---|---|---|---|
| MOTOR R.P.M. | DRIVE WHEEL R.P.M. | MOTOR TO DRIVE WHEEL RATIO | M.P.H. | MOTOR R.P.M. | DRIVE WHEEL R.P.M. | MOTOR TO DRIVE WHEEL RATIO | M.P.H. |
| 805 | 28 | 11.5 | 5 | 805 | 28 | 11.5 | 5 |
| 1849 | 210 | 88 | 15 | 1849 | 210 | 8.8 | 15 |
| 1680 | 420 | 4 | 30 | 2562 | 420 | 6.1 | 30 |
| 630 | 567 | .9 | 45 | 1927 | 567 | 3.4 | 45 |
| 841 | 757 | .9 | 60 | 2859 | 757 | 3.4 | 60 |

The amount of designed lag developed between primary annulus gear 8 and secondary annulus gear 9 will produce a like amount of lag between differential drive carrier 13 and primary beveled ring gear 11 at the point of start-up. If, for example, the planetary and annulus gears have a designed 12 to 1 start-up ratio, the forward rotation of differential pinion gear 15 will cause output shaft beveled ring gear 19 and associated output shaft 22 to revolve slightly faster thereby reducing the input shaft 1 to output shaft 22 ratio to approximately 10.8 to 1 at the point of start-up.

In summary, if for example, the torque impeller had a built-in ratio of 15 to 1, the circumferential difference between primary pinion gears 6 and secondary pinion gears At start-up, it is assumed the motor to drive wheel ratio would be approximately the same. The torque impeller would, of course, be capable of a 15 to 1 start-up ratio or one that only requires an 8 to 1 ratio depending upon acceleration applied. If, in the above case, the vehicle equipped with a torque impeller having a ratio of 15 to 1 at start-up and revolving at 700 RPM, was suddenly increased in speed to 5000 RPM, it would go from a 1 to 1 ratio to more than 7 to 1 at 50 MPH which would allow the vehicle to pass another with a great burst of speed. The sudden acceleration would make input shaft 1 and planetary carrier 5 revolve faster with ease thereby greatly increasing torque and speed to output shaft 22.

As can be seen, the trans-planetary mechanical torque impeller has the capability of effectively providing an input shaft to output shaft ratio at start-up as well as all other conditions or demands placed upon it. It will match the input power and speed to the output shaft load under all conditions. Other than forward and rear bearings, there is very little internal power loss, such as with the prior art devices. There are no bands, no pumps, no temporary case attachments, no clutches and, if used in vehicles, it requires no shifting other than to go forward or reverse from a neutral position. As, for example, a 12 to 1 or 15 to 1 motor to drivewheel start-up ratio would allow a 1 to 1 or down to 0.75 to 1 ratio differential to be used thereby providing a true motor to drivewheel over-drive which would result in considerably less fuel usage under all driving conditions except perhaps long uphill grades where the torque impeller will respond to the gear ratio necessary in which case it may be comparable with present art.

The torque impeller of this invention is usable with electric motors to drive any type of equipment or electric vehicle which requires a slow geared down start-up speed plus variable speed otherwise. Due to the ballbearing or ratchet type clutch limiting one way rotation of differential pinion gear 15, the torque impeller is limited to one rotational direction only which can be either clockwise or counter-clockwise.

Figure 4:
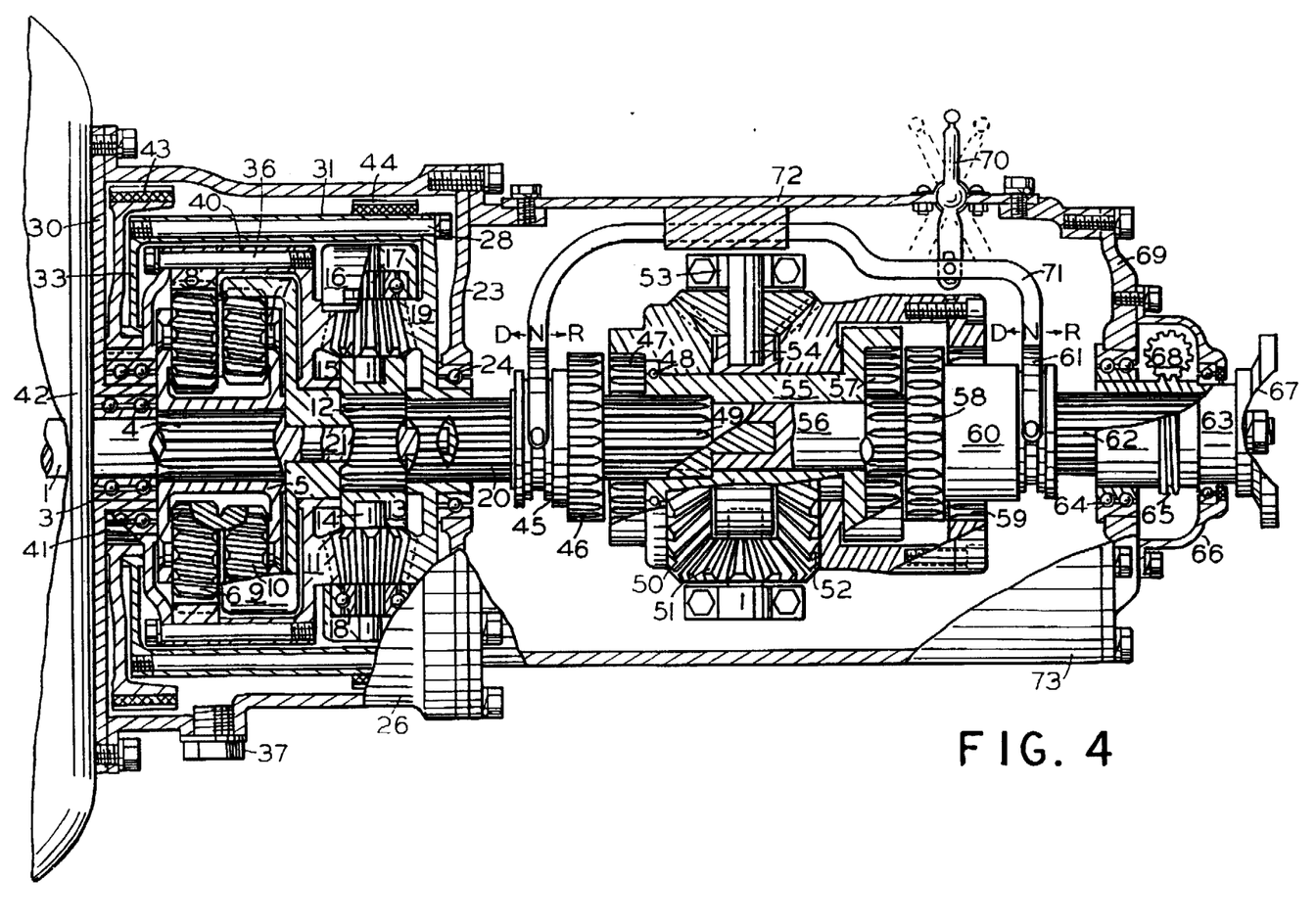
FIG. 4 is an operational side view illustrating how a single improved torque impeller can be utilized in a fully functional transmission or transfer gear case.

The torque impeller of this invention can be used preceding a forward-neutral-reverse gear box or gear transfer box such as is shown on FIG. 4 and is so versatile that it can be used with any shifting type mechanism desired. FIG. 4 is a simple but effective F-N-R gearbox usable in a vehicle and can be divided into two separate units or locations, if necessary, providing the torque impeller is located in advance of the gear transfer box. FIG. 4 shows the gear box in a neutral position which would allow output shaft 20 with splines to also revolve outer drive shaft extension 55 and drive inner spline 57 through outer drive shaft coupling spline 49. Output shaft 63 would remain stationary under this condition. When placed in drive, gear control 70 is pulled, which causes shifter arm 71 to go forward which would make drive-reverse spline 58 engage with drive inner spline 57. Under this condition, reverse pinion gear 51, and reverse beveled ring gear 52 all remain stationary. For reverse, reverse outer spline 46 meshes with reverse inner spline 47 while drive-reverse outer spline 58 meshes with reverse outer spline 59. Under this condition, reverse drive beveled ring gear 50 is made to revolve reverse pinion gear 51 which, in turn, revolves reverse beveled ring gear 52 in the opposite direction taking output shaft 63 in reverse. This is a simple but effective way to make use of the torque impeller in any kind of vehicle and any type motor source. FIG. 4 shows housing 42 which can be a manually operated clutch or a torque converter depending upon the manufacturer's choice.

When vehicles descend a long down-hill grade, the weight of the vehicle normally cause the drive wheels to revolve the motor instead of vice-versa. Low gear brake 43, when applied, will cause a slow down or stop of annulus gear 8 which will then place the torque impeller in a lower gear mode as needed. This will then allow the engine combustion to slow down the vehicle. This braking action can be accomplished by a brake, as shown, or by a disc-type brake. The braking mechanism or cylinder is not shown, and can be accomplished by use of air brakes, hydraulic brakes or by electric solenoid brakes. It would be especially adaptable when used with a solenoid operated brake which would be particularly effective in vehicles equipped with cruise control which could then be designed to limit the vehicle from going in an excess speed over and above the cruise control setting due to a long down-hill grade. Low gear brake 43 can be manually or electronically operated and controlled.

Drive-neutral-reverse holding brake 44 is optional. However, when a torque impeller is driven or rotated through a torque converter, it is needed to prevent rotation of the torque impeller output shaft 22 in order that splines 46, 47, 57 and 58 can mesh without difficulty when shifting from neutral to forward or reverse. The brake cylinder or solenoid is not shown but can be operated by any manual or electronic device. It should be noted that the automotive torque impeller drive shown in FIG. 4 has only a F-N-R available and that it needs no other unless it would be a setting for parking which could easily be added. It should also be noted that for large trucks or other motor driven transportation requiring a large gear ratio at start-up, two torque impellers can be used in series to obtain the desired low gear ratio. The torque impeller can be lubricated with various type oils or transmission fluid if so designed. A torque impeller can also be used with an electric motor and gear box, thereby eliminating the need for a repulsion-induction type motor to be used to drive an electric vehicle using the least amount of electricity.

Figure 5:
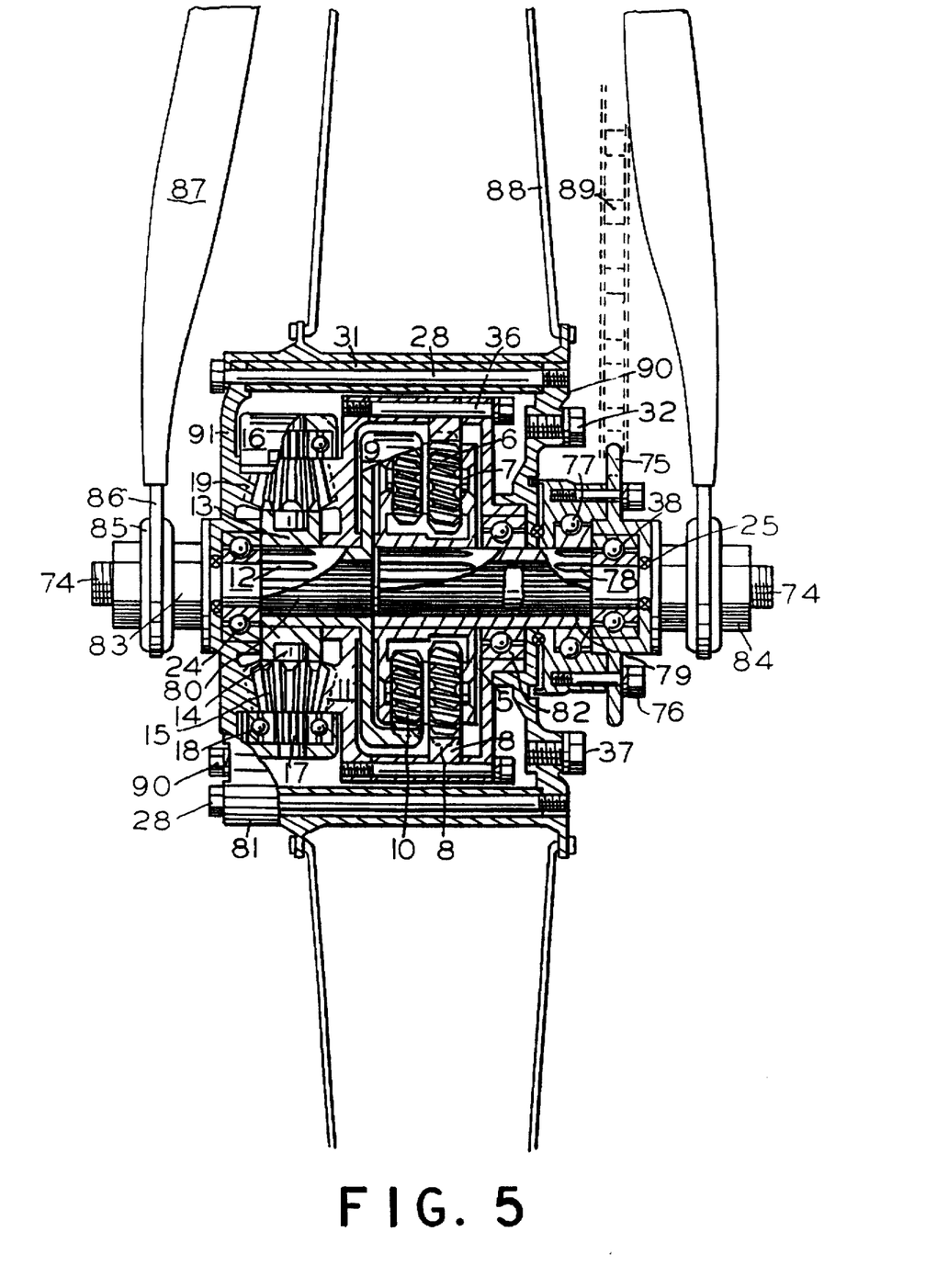
FIG. 5 is an operational view of an improved torque impeller designed to work on a bicycle or motorcycle with all working parts arranged in reverse of the configuration shown in FIG. 1 and with a stationary thru bolt in the center to allow the entire torque impeller to revolve around it while it is bolted to the bicycle frame for stability.

FIG. 5 shows a torque impeller housed in the rear hub of a bicycle wheel. The input and output mechanisms have been reversed in location when compared to FIGS. 1 and 4, to better accommodate the chain drive sprocket which is generally located on the right hand side of bicycles. The principle of operation of the torque impeller is the same except that stationary thru bolt 74 is bolted to frame 87 with adjusting and lock nuts 83 and 84. It runs through the center with splined differential drive 12 and planet carrier 5 revolving around it on needle bearings 79 and 80 for minimum resistance and ease of operation. To obtain maximum benefit from the torque impeller, a much larger front sprocket not shown, is used which drives chain 89 and rear sprocket assembly 75. Ballbearing or ratchet type one way clutch 77 can be used which is splined to planet carrier 5 through spline 78. The torque impeller operates the same but eliminates the need for the outer housing 26 shown on FIG. 1 through FIG. 4. Inner housing 31 is instead inserted into spoke-hub 81 and held in place by alternate inner housing assembly bolts 28. Alternate housing assembly bolts 90 need not be removed when the torque assembly is placed or removed from spoke hub 81. This allows the wheel to remain intact at all times.

A conventional 10 speed bicycle normally has pedal to rear wheel ratios of approximately 1.39 to 1 for low and up to 3.71 to 1 for the highest ratio of speed. Pedals revolved at 50 RPM on a 26 inch 10 speed bike will propel the bike approximately 14 MPH in the 3.71 to 1 highest ratio. A 26 inch bicycle equipped with a torque impeller drive with an internal 4.78 to 1 low gear ratio will permit the front sprocket to be doubled in size giving it a pedal to rear wheel ratio of 1.35 to 1 in low gear and a high gear ratio of 7.43 to 1. With pedals revolving at 50 RPM the bicycle will now travel 28 MPH on the level or down-hill grade and without ever shifting gears for various grades or road conditions. See table number 2 below for greater detail.

TABLE NUMBER 2

26" BICYCLE WITH TORQUE IMPELLER VS 10 SPEED STANDARD BICYCLE

| 4.78-1 LOW GEAR RATIO TORQUE IMPELLER 1-1 HIGH GEAR RATIO | | | | MANUAL SHIFT SHOWN-5 TIMES 1.39-1, 2.0-1, 2.6-1, 3.1-1, 3.71-1 | | | |
|---|---|---|---|---|---|---|---|
| PEDAL TO REAR WHEEL RATIO | PEDAL R.P.M. | REAR WHEEL R.P.M. | APPROX. M.P.H. | PEDAL TO REAR WHEEL RATIO | PEDAL R.P.M. | REAR WHEEL R.P.M. | APPROX. M.P.H. |
| 1.35 | 10 | 13.5 | 1.04 | 1.39 | 10 | 13.9 | 1.07 |
| 3.02 | 20 | 60.4 | 4.67 | 2.0 | 20 | 40 | 3.09 |
| 4.49 | 30 | 135 | 10.43 | 2.6 | 30 | 78 | 6.02 |
| 5.96 | 40 | 238 | 18.39 | 3.1 | 40 | 124 | 9.58 |
| 7.43 | 50 | 371 | 28.67 | 3.71 | 50 | 185.5 | 14.33 |

The torque impeller of this invention will match the power source; i.e. the person's capability of pedaling the bike, with the road conditions. It can also be manufactured using lighter materials to keep weight down to a minimum. For certain small operational devices, such as bicycles in particular it should be understood that fiber gears such as nylon, polypropylene, polytetrafluoroethylene, (teflon) glass fiber, reinforced thermosetting or thermoplastic resinous materials and the like may be employed to constitute any of the gears or parts in the torque impeller. Bicycles equipped with a torque impeller drive will outrun all others on a level grade and should outperform manual shifting bikes uphill since no shifting is required at any time. Riding a bike against a high wind would require about the same amount of effort in both cases. FIG. 5 shows the use of a torque impeller on a bicycle. It can also be employed to drive a motorcycle in much the same way. Of course it would require a different built-in input shaft to output shaft ratio.

Figure 6:
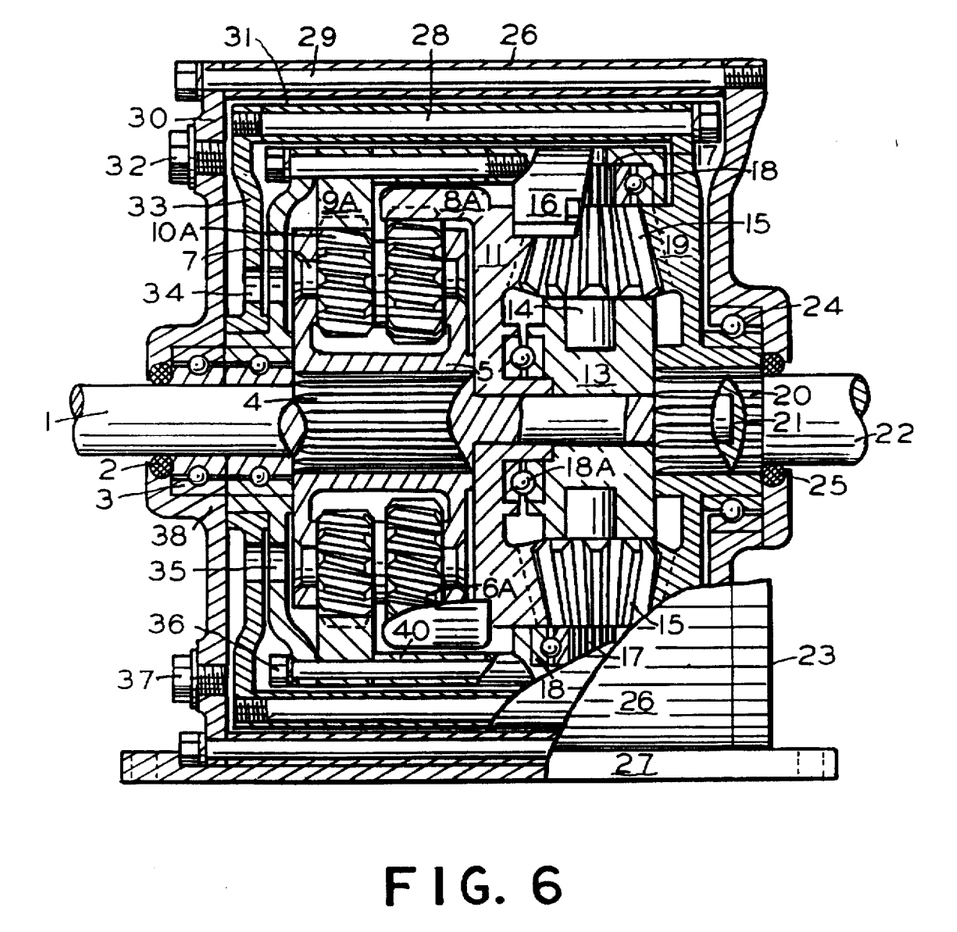
FIG. 6 is a side view of a second preferred embodiment of a trans-planetary torque impeller in accordance with the present invention.

FIG. 6 shows how the input section configuration of planetary and annulus gears can be altered or reversed in location to drive the differential output section with no difference in torque delivered. The alternative location of parts are identified with the letter A. With this arrangement secondary planetary gears 10A and associated annulus gear 9A are operated in advance of primary planetary gears 6A and primary annulus gear 8A which in either case drives primary beveled ring gear 11. Secondary annulus gear 9A is bolted to outer differential housing 16 which in turn is bolted to differential drive carrier 13 thereby eliminating the need for splined differential drive 12.

As a backup to clutch 18, ballbearing or ratchet type clutch 18A can be located between the shank end of primary beveled ring gear 11 and differential drive carrier 13 as shown. The alternatives shown can be used in all transplanetary torque impellers shown from FIG. 1 through FIG. 6.

The improved torque impeller of this invention is the key to use of smaller motors in the industrial and transportation fields and has great potential for conserving fossil fuels worldwide as well as helping to clean up the environment from land based transportation. It has far less parts to wear out, is more economical to manufacture and will outperform all others in the prior art.

PARTS LIST

1. Input shaft
2. Front oil seal
3. Front bearing
4. Input planetary carrier spline
5. Planetary carrier
6. Primary planetary pinion gear
7. Planetary pinion axle
8. Primary annulus gear
9. Secondary annulus gear
10. Secondary planetary pinion gear
11. Primary beveled ring gear
12. Splined differential drive gear
13. Differential drive carrier
14. Differential pinion gear bearing
15. Differential pinion gear
16. Outer differential housing
17. Differential pinion gear spline
18. Ballbearing or ratchet type rotational one way clutch
19. Output shaft beveled ring gear
20. Output shaft spline
21. Input shaft extension stabilizer
22. Output shaft
23. End plate
24. Rear bearing
25. Rear oil seal
26. Outer casing
27. Base
28. Inner housing assembly bolt
29. Outer casing assembly bolt
30. Outer front end plate
31. Inner housing
32. Lubricant fill plug
33. Inner housing front end plate
34. Upper lubricant access port
35. Lower lubricant access port
36. Annulus gear-ring gear housing bolt
37. Lubricant drain plug
38. Annulus gear-ring gear assembly bearing
39. Planetary carrier bolt
40. Annulus gear-ring gear housing
41. Splined low gear brake assembly
42. Clutch or torque converter housing
43. Low gear brake
44. D-N-R holding brake
45. Reverse coupling
46. Reverse outer spline 47. Reverse inner spline
48. Interlocking ring
49. Splined outer drive-shaft coupling
50. Reverse drive beveled ring gear
51. Reverse pinion gear
52. Reverse beveled ring gear
53. Pinion bearing housing
54. Reverse pinion gear axle
55. Outer drive shaft extension
56. Drive shaft extension
57. Drive inner spline
58. Drive-reverse outer spline
59. Reverse outer spline
60. Drive coupling
61. Shifter fork
62. Output shaft spline
63. Output shaft
64. Rear bearing
65. Speedometer worm drive gear
66. Speedometer drive gear cover
67. Universal joint flange
68. Speedometer drive gear
69. End plate
70. Gear control selector
71. Shifter arm
72. Gear box cover
73. Gear box casing
74. Thru bolt
75. Rear sprocket assembly
76. Rear sprocket bolt
77. Ballbearing or ratchet type one way rotational clutch
78. Sprocket-planet carrier spline
79. Sprocket-planet carrier needle bearings
80. Annulus gear-differential needle bearings
81. Spoke hub
82. Annulus gear bearing
83. Adjusting nut
84. Locking nut
85. Washer
86. Frame adapter
87. Bike frame
88. Spoke
89. Chain
90. Alternate-housing assembly bolt While preferred embodiments of a trans-planetary mechanical torque impeller in accordance with the present invention have been set forth fully and completely hereinabove, it will be apparent to one of skill in the art that a number of changes in, for example, the overall size of the device, the particular materials used, the vehicle in which the device is used and the like could be made without departing from the true spirit and scope of the present invention which is accordingly to be limited only by the following claims.

What is claimed is:

1. A trans-planetary torque impeller capable of infinitely responding to changing load conditions while providing specific low input shaft to output shaft ratios at start-up, said torque impeller comprising:

a rotatable input shaft;

a planetary carrier supported on and rotatable with said input shaft;

at least two sets of joined input planetary pinion gears rotatably supported by said planetary carrier, a primary planetary pinion gear in each of said sets of joined input planetary pinion gears being larger in circumference than an adjoining secondary planetary pinion gear;

a primary annulus gear supported on, and rotatable with respect to said input shaft, and a secondary annulus gear supported by an extension of said input shaft with said at least two sets of joined input planetary pinion gears revolving in unison with each other, said primary and said secondary planetary pinion gears meshing with and planetarily revolving within said primary and said secondary annulus gears;

an output shaft rotatably supported in said mechanical torque impeller;

a primary beveled ring gear rotatably driven by one of said primary and said secondary annulus gears, and being in meshing engagement with differential pinion gears housed in a differential drive carrier, said differential pinion gears being in meshing engagement with an output shaft beveled ring gear which is splined to said output shaft, the other of said primary and said secondary annulus gears being splined to said differential drive carrier to constitute the main driving force for said differential pinion gears, said output shaft beveled ring gear being driven by said differential pinion gears, wherein for each revolution of said input shaft and said at least two sets of planetary pinion gears at start-up, said circumferential difference between said primary planetary pinion gears and said secondary planetary pinion gears is applied to said primary annulus gear and to said secondary annulus gear which together drive said differential pinion gears an equal circumferential distance to thereby affect a rotation of said output shaft which is slower than said input shaft rotation at start-up and under load conditions, and to infinitely and continually seek a 1 to 1 ratio between said input shaft and said output shaft as said input shaft speed increases, and as the load on said output shaft decreases.

2. The torque impeller of claim 1 further including one way rotational clutches associated with said differential pinion gears and wherein said primary and said secondary planetary pinion gears and said primary and said secondary annulus gears govern a start-up low gear ratio obtainable by said torque impeller and apply rotational forces to said differential pinion gears which are limited in their rotation to one direction by said one way rotational clutches, to prevent said primary beveled ring gear from over-running said output shaft beveled ring gear while permitting limited reverse rotation of said primary beveled ring gear which adds to a forward rotation of said output shaft beveled ring gear thereby assisting said other of said primary and said secondary annulus gears in accomplishing forward rotation of said differential drive carrier which will revolve more rapidly at start-up than said primary annulus gear and said primary beveled ring gear, said forward rotation of said differential drive carrier and said differential pinion gears delivering rotational power and torque to said output shaft beveled ring gear and said associated output shaft thereby causing said output shaft beveled ring gear and said output shaft to revolve slightly faster than said one of said primary and said secondary annulus gears and said associated primary beveled ring gear.

3. The torque impeller of claim 1 including a housing for said primary and said secondary annulus gears and for said primary and said output ring gears, and further including a braking device associated with said housing, said braking device being usable to apply braking power to cause said torque impeller to go into a lower gear mode when said torque impeller is used on vehicles operating on downhill grades that require added engine combustion to slow down.

4. The torque impeller of claim 1 further including a stationary thru bolt which is usable to centrally mount said torque impeller for support, said input shaft, said planetary carrier, said differential drive carrier and said output shaft being hollow to allow rotation of said parts and to accommodate said thru bolt to facilitate use of said torque impeller on devices that require throughbolt operation and mounting support.

* * * * *